United States Patent
Tobergte et al.

(10) Patent No.: US 8,944,026 B2
(45) Date of Patent: Feb. 3, 2015

(54) MULTI-CYLINDER INTERNAL COMBUSTION ENGINE AND METHOD FOR OPERATING A MULTI-CYLINDER INTERNAL COMBUSTION ENGINE

(75) Inventors: Michael Tobergte, Cologne (DE); Carsten Weber, Leverkusen (DE); Kay Hohenboeken, Cologne (DE); Helmut Hans Ruhland, Eschweiler (DE); Bert Pingen, Swisttal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 825 days.

(21) Appl. No.: 13/224,228

(22) Filed: Sep. 1, 2011

(65) Prior Publication Data

US 2012/0055444 A1 Mar. 8, 2012

(30) Foreign Application Priority Data

Sep. 7, 2010 (DE) .......................... 10 2010 037 362

(51) Int. Cl.
| | | |
|---|---|---|
| F02D 13/06 | (2006.01) | |
| F02B 3/00 | (2006.01) | |
| F02D 41/00 | (2006.01) | |
| F02D 17/02 | (2006.01) | |
| F02D 17/00 | (2006.01) | |
| F02D 45/00 | (2006.01) | |
| F02P 5/14 | (2006.01) | |
| F02D 13/02 | (2006.01) | |
| F02M 25/07 | (2006.01) | |

(52) U.S. Cl.
CPC ............ F02D 41/0087 (2013.01); F02D 13/06 (2013.01); F02D 17/02 (2013.01); F02D 13/0207 (2013.01); F02D 13/0219 (2013.01); F02M 25/0754 (2013.01); F02M 25/0755 (2013.01); Y02T 10/18 (2013.01)
USPC ......................... 123/294; 123/198 F; 123/481

(58) Field of Classification Search
USPC ....... 123/294, 198 F, 198 DB, 481, 52.1, 58.1
See application file for complete search history.

(56) References Cited

U.S. PATENT DOCUMENTS

| 4,144,864 A | 3/1979 | Kato et al. | |
|---|---|---|---|
| 6,336,440 B1 * | 1/2002 | Schmitz et al. | .......... 123/406.27 |

FOREIGN PATENT DOCUMENTS

| DE | 26 53 014 A1 | 5/1978 |
|---|---|---|
| DE | 10 2004 011 811 A1 | 9/2005 |
| GB | 2 259 154 A | 3/1993 |
| JP | 7-279699 A | 10/1995 |

* cited by examiner

*Primary Examiner* — Hieu T Vo
(74) *Attorney, Agent, or Firm* — Julia Voutyras; Alleman Hall McCoy Russell & Tuttle LLP (57) ABSTRACT

A method for partial cylinder cutoff is provided. The method comprises operating a multi-cylinder internal combustion engine with applied ignition, in which an odd number n of cylinders is arranged in line, and during partial-load operation when engine load is below threshold, enabling a partial cutoff of the cylinders, the partial cutoff comprising operating each cylinder only intermittently such that each cylinder is fired and cut off in turn at an interval of (2*720° CA)/n.

20 Claims, 6 Drawing Sheets

MULTI-CYLINDER INTERNAL COMBUSTION ENGINE AND METHOD FOR OPERATING A MULTI-CYLINDER INTERNAL COMBUSTION ENGINE

RELATED APPLICATIONS

This application claims priority to German Patent Application No. 102010037362.1, filed on Sep. 7, 2010, the entire contents of which are being incorporated herein by reference.

FIELD

The disclosure relates to a multi-cylinder internal combustion engine with applied ignition.

BACKGROUND AND SUMMARY

Spark-ignition engines operate with a homogeneous fuel-air mixture which, in the absence of direct injection, is prepared through external mixture formation by introducing fuel into the intake air in the intake tract. The required power output is adjusted by varying the combustion chamber charge so that, unlike in the diesel engine, operation of the spark-ignition engine is based on a quantitative control.

The load is generally controlled by means of a throttle valve provided in the intake tract. By adjusting the throttle valve the pressure of the intake air downstream of the throttle valve can be reduced to a greater or lesser degree. The further the throttle valve is closed, the greater the pressure loss of the intake air over the throttle valve and the lower the pressure of the intake air downstream of the throttle valve and upstream of the inlet to the cylinder. Given a constant combustion chamber volume it is possible in this way to adjust the air mass, that is to say the quantity, by way of the intake air pressure. However, in the partial load range, since small loads require a high degree of throttling and pressure reduction in the intake tract, charge cycle losses increase as the load diminishes and the throttling increases. As a result, engine efficiency and thus fuel economy are compromised.

Various strategies have been developed for dethrottling an internal combustion engine with applied ignition, in order to reduce the losses described. Since in partial load operation the spark-ignition engine has a poor efficiency due to the throttle control, whereas the diesel engine has a greater efficiency, attempts have been made to combine the two methods of operation with one another, in order to exploit the advantages of the diesel engine method for the benefit of the spark-ignition engine method. Here the development work has concentrated primarily on the essential features of the two methods. The conventional spark-ignition method is characterized by a mixture compression, a homogeneous mixture, an applied ignition, and the quantitative control, whereas the conventional diesel engine method is characterized by an air compression, an inhomogeneous mixture, a compression ignition and the qualitative control.

One approach to dethrottling, for example, is to operate the spark-ignition engine with direct injection. Direct fuel injection is a suitable means for achieving a stratified combustion chamber charge. Within certain limits, the direct injection of fuel into the combustion chamber thereby allows a qualitative control in the spark-ignition engine. The mixture formation ensues through the direct injection of fuel into the cylinders or rather the air present in the cylinders and not through external mixture formation, in which the fuel is introduced into the intake air in the intake tract.

Another possible way of optimizing the combustion process of a spark-ignition engine lies in the use of a variable valve gear. In contrast to conventional valve gears, in which both the valve lift and also the timings, that is to say the opening and closing times of the intake and exhaust valves, are predetermined as invariable quantities by the non-adjustable and hence inflexible mechanism of the valve gear, these parameters influencing the combustion process and thereby the fuel consumption can be varied to a greater or lesser degree by means of variable valve gears. A load control with no throttle and thereby no losses is possible simply by being able to vary the closing time of the intake valve and the intake valve lift.

The concepts described above have the disadvantage that they are not suitable for retrofitting to engines already on the market, since they require substantial modifications to the basic engine and/or the valve gear, and additional complex components.

One approach to the dethrottling of spark-ignition engines already on the market is afforded by the cylinder cutoff. This serves to improve, that is to say to increase the efficiency in the partial-load range since the cutoff of one cylinder of a multi-cylinder internal combustion engine increases the load of the cylinders in operation, so that the throttle valve may be opened further in order to introduce a larger air mass into these cylinders, so that overall a dethrottling of the internal combustion engine is achieved. Owing to the larger air mass delivered, the cylinders still being operated during the partial cutoff have an improved mixture formation and tolerate higher exhaust gas recirculation rates. Further advantages in terms of efficiency accrue in that owing to the absence of combustion a cylinder which has been cut off does not generate any heat losses through the wall due the transmission of heat from the combustion gases to the combustion chamber walls.

Besides the aforementioned advantages, partial cutoff, particularly in multi-cylinder internal combustion engines having an odd number n of cylinders, also have disadvantages, which are often an obstacle to use in series production. Conventionally, in an inline three-cylinder engine, for example, one cylinder of the engine is embodied as a cutoff cylinder. In normal operation, that is to say when all three cylinders are in operation and the partial cutoff is deactivated, the cylinders are fired in the firing order 1-2-3 at an interval of 240° CA. In the context of a partial cutoff, the cutoff cylinder is deactivated and only the two remaining cylinders continue to operate, so that an irregular firing pattern ensues, in which the firing interval alternates between 240° CA and 480° CA, which results in several detrimental effects.

The engine structure excited to structure-borne sound oscillations by the impulses and alternating forces emits the structure-borne sound via its engine surfaces as airborne sound and in this way generates the actual engine noise. The irregular firing pattern leads to an unharmonious engine noise, which is perceived as unpleasant. This is disadvantageous, since the noise generated by the internal combustion engine has a considerable influence on customers' purchasing behavior. Further, excitation of the crankshaft in the natural frequency range can result in high rotational oscillation amplitudes, which can even lead to fatigue fracture.

The problems discussed taking a three-cylinder internal combustion engine as an example similarly exist in any multi-cylinder internal combustion engine, in which an odd number n of cylinders is arranged in line, for example also in the case of a five-cylinder internal combustion engine, in which five cylinders are arranged in line. The inventors herein have recognized the above issues and provide a solution to at least partially address them. Thus, a method for operating a multi-cylinder internal combustion engine with applied ignition having an odd number n of cylinders arranged in line is provided. The method comprises operating a multi-cylinder internal combustion engine with applied ignition, in which an odd number n of cylinders is arranged in line, and, during partial-load operation when engine load is below threshold, enabling a partial cutoff of the cylinders, the partial cutoff comprising operating each cylinder only intermittently such that each cylinder is fired and cut off in turn at an interval of (2*720° CA)/n.

In the method according to the present disclosure, in normal operation, when all n cylinders are being operated and the partial cutoff is deactivated, the n cylinders are fired at a firing interval of approximately 720° CA/n. During the partial cutoff, on the other hand, each cylinder is operated intermittently and in such a way that each cylinder is fired and cut off in turn, so that in partial load operation the cylinders are fired in a modified firing order and at a firing interval of approximately (2*720° CA)/(n). The firing interval therefore doubles with a partial cutoff of the cylinders. The partial cutoff according to the disclosure leads to a uniform firing interval, that is to say to a regular firing pattern, and thereby to a harmonious engine noise.

In a multi-cylinder, in-line engine having an odd number of cylinders and applied ignition, the method for partial cutoff according to the present disclosure makes it possible to reduce the charge cycle losses which are bound to occur due to the quantitative control by means of a throttle valve, whilst avoiding an irregular firing pattern, in which the firing interval varies and which has a detrimental effect on the noise emissions. Thus, dethrottling of the engine can be achieved without having to accept disadvantages in terms of the noise emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
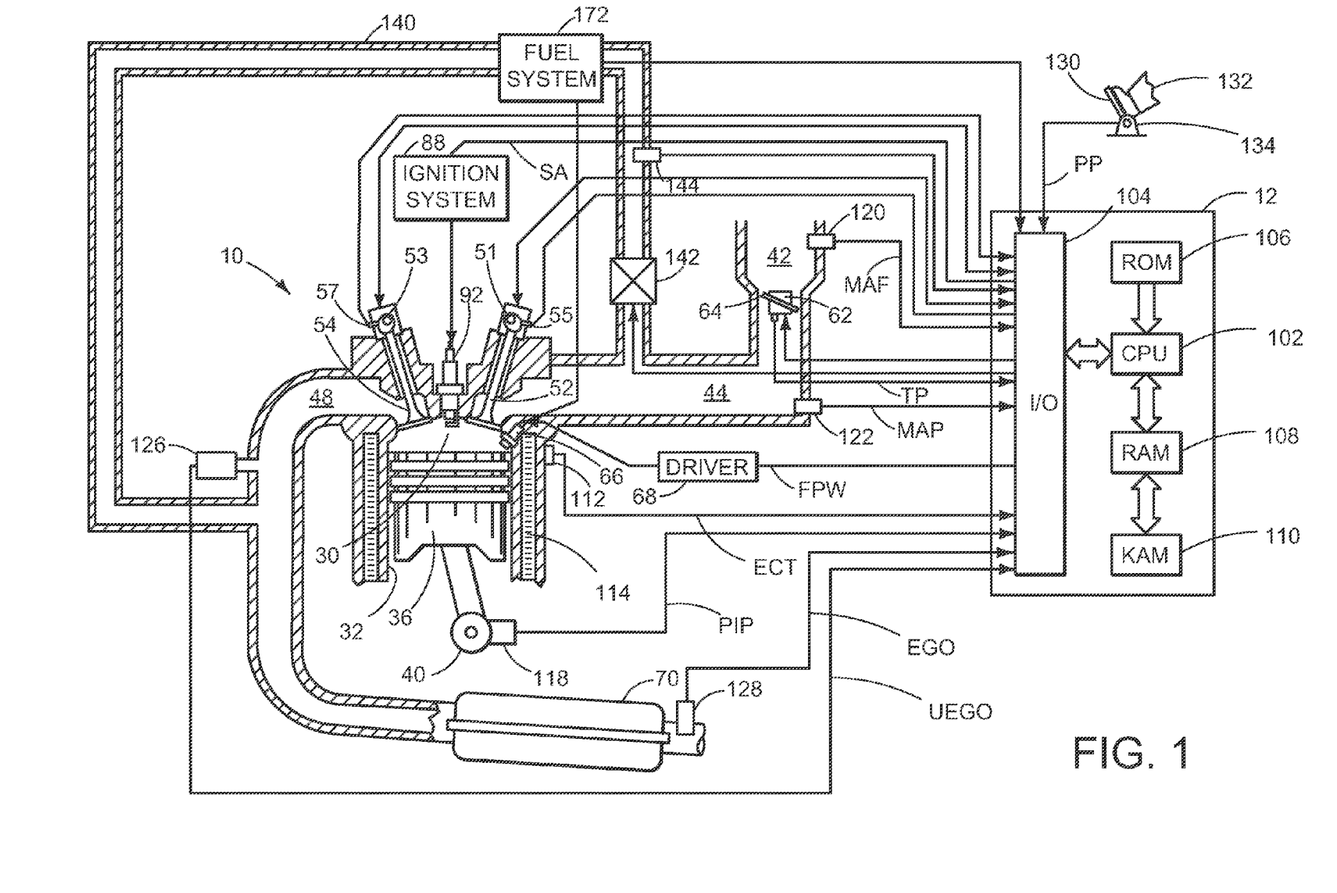
FIG. 1 shows a schematic diagram of an engine including a cylinder and an ignition system.

In order to dethrottle the engine to improve fuel economy, a partial cylinder cutoff may be activated in which each cylinder is cut off in turn. FIG. 1 shows an example engine that can be operated in the partial cutoff mode according the method of FIG. 2. FIGS. 3-6 depict ignition timing diagrams during the execution of the method of FIG. 2.

Referring now to FIG. 1, a schematic diagram showing one cylinder of multi-cylinder engine 10, which may be included in a propulsion system of an automobile, is illustrated. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a $NO_x$, HC, or CO sensor.

Emission control device 70 is shown arranged along exhaust passage 48 downstream of exhaust gas sensor 126. Device 70 may be a three way catalyst (TWC), configured to reduce NOx and oxidize CO and unburnt hydrocarbons. In some embodiments, device 70 may be a $NO_x$ trap, various other emission control devices, or combinations thereof.

A second, downstream exhaust gas sensor 128 is shown coupled to exhaust passage 48 downstream of emissions control device 70. Downstream sensor 128 may be any suitable sensor for providing an indication of exhaust gas air-fuel ratio such as a UEGO, EGO, HEGO, etc.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Figure 2:
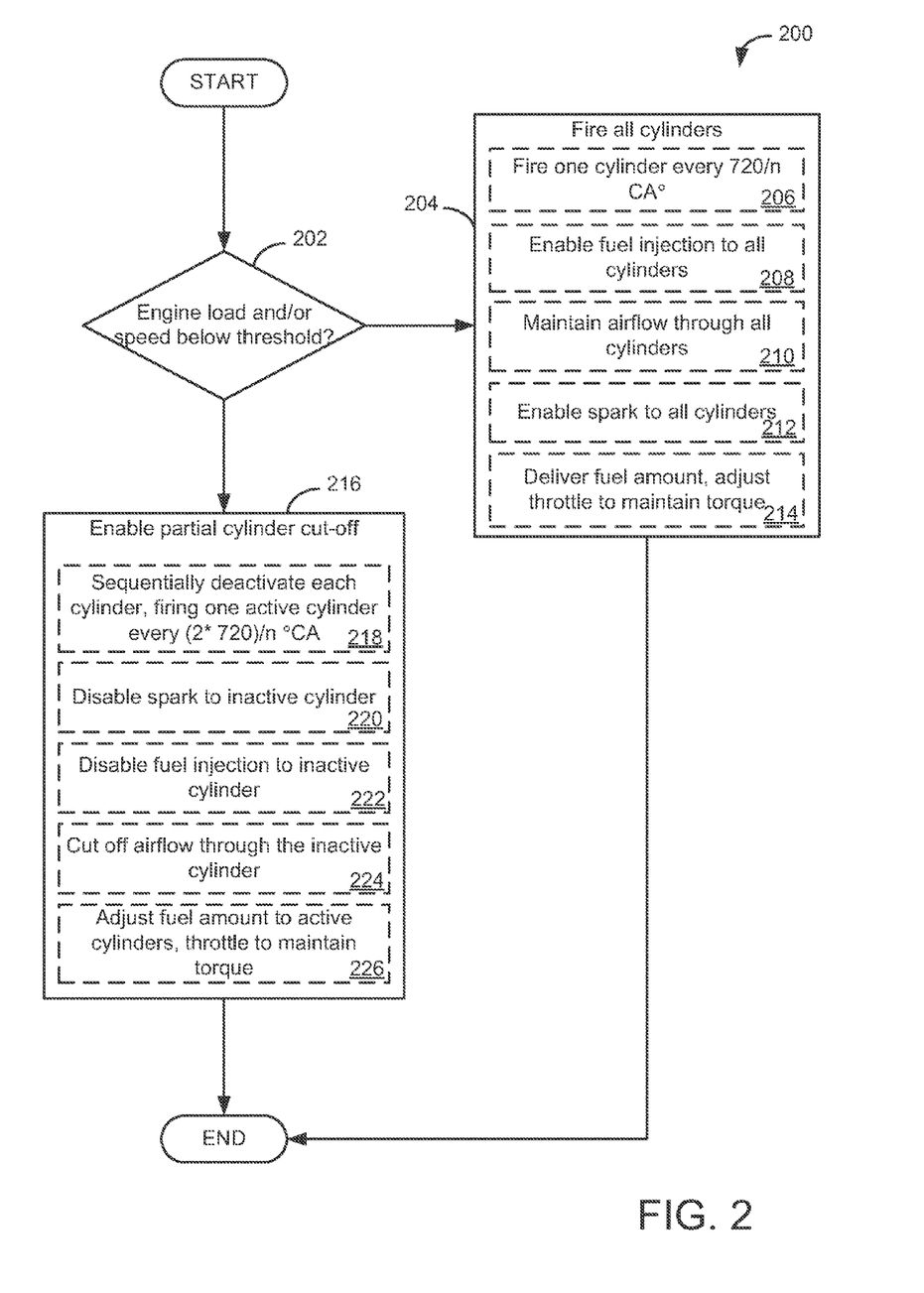
FIG. 2 shows a flow diagram illustrating an example method for operating an engine in partial cutoff mode.

FIG. 2 is a flow diagram illustrating a method 200 for operating an engine in a partial cutoff mode according to an embodiment of the present disclosure. Method 200 comprises, at 202, determining if engine load and/or speed are below a threshold. Partial cutoff of the cylinders may be activated when engine load is a below a threshold. The threshold may be any suitable engine load below which throttle position, fuel injection amounts, etc. may lead to reduced fuel economy, such as 20% load, 30% load, etc. Further, the load threshold may vary as a function of engine speed. For example, at higher engine speeds, the load threshold may be lower than at lower engine speeds. This means that there is not only an actual load, below which one cylinder is cut off as a function of the engine speed, but rather an engine speed-dependent approach defining a partial load range within a speed-load map, in which a partial cutoff is undertaken.

If it is determined at 202 that engine load and/or speed are not below the threshold, method 200 proceeds to 204 to fire all cylinders. In the context of the present disclosure, firing a cylinder means that a combustible or ignitable fuel-air mixture is provided in the cylinder, the ignition is initiated, that is to say an ignition spark is introduced, and the fuel-air mixture ignites and is burned. In this respect there is a difference between the ignition and the initiation of the applied ignition, that is to say the activation of the applied ignition. Firing all the cylinders comprises firing one cylinder every 720°/n CA at 206. For example, in a three-cylinder engine (n=3) when all three cylinders are in operation, the cylinders may be fired in the firing order 1-2-3 at an interval of 240° CA. In other embodiments, for example in a five cylinder engine (n=5), the five cylinders may be fired in sequence in the ignition order 1-2-4-5-3 at an interval of 144° CA. For the purposes of this disclosure, the numbering of the cylinders is governed by DIN 73021. In the case of in-line engines the cylinders are numbered continuously in series, starting on the side situated opposite the clutch.

In order to fire the cylinders, fuel injection to all cylinders is enabled at 208. To ignite the fuel delivered to the cylinders, airflow through each cylinder is maintained at 210 and spark is enabled for each cylinder at 212. Additionally, the throttle position and the amount of fuel delivered are set to maintain the operator requested torque at 214.

If it is determined at 202 that engine load and/or speed are below the threshold, method 200 proceeds to 216 to enable partial cylinder cutoff operation. In partial-load operation one cylinder is cut off, so that the load demand on the remaining cylinders is increased. This requires an opening of the throttle valve in order to introduce a larger mass of air into these cylinders and leads to a dethrottling of the internal combustion engine. Enabling partial cutoff operation comprises, at 218, sequentially deactivating each cylinder, and firing one active cylinder every (2*720)/n CA°. No specific cylinder of the engine is embodied as the cutoff cylinder and deactivated in the context of a partial cutoff, but rather each cylinder is fired and deactivated. That is to say, each cylinder is cut off in turn during a partial cutoff in partial-load operation, with only one cylinder at a time being cut off and the remaining cylinders being in operation. A suitable firing order advantageously ensures a regular firing pattern.

For example, in a three-cylinder engine, during partial cutoff, when each cylinder is fired for one working cycle and is cut off for one working cycle, the firing order starting from operation of the first cylinder in the working cycle may be 1-3-2 with a uniform firing interval of 480° CA. In another embodiment, in a five cylinder engine, during the partial cutoff each cylinder is operated intermittently in such a way that each cylinder is fired and cut off in turn, so that in partial-load operation the cylinders may be fired in a modified firing order 1-4-3-2-5 at a firing interval of 288° CA.

Deactivating the cylinders may be carried out in any suitable way, including one or more of disabling spark, disabling fuel injection, and disabling airflow to the inactive cylinder. For example, at 220, spark ignition to the deactivated cylinder may be disabled. A cylinder may be cut off through deactivation of the applied ignition and thereby to reliably avoid an unwanted firing, for example by residual gases remaining in the cylinder.

Fuel injection to the cut-off cylinder may be deactivated at 222. As described with respect to FIG. 1, direct injection is provided for supplying fuel to the cylinders. In principle the fuel supply of a cutoff cylinder could be maintained and a cylinder cutoff could be undertaken solely by deactivation of the applied ignition. However, this would be extremely disadvantageous with regard to the fuel consumption and the pollutant emissions and would be at odds with the objective being pursued by the partial cutoff, namely of reducing the fuel consumption and improving engine efficiency. The direct injection allows a cut-off and selective cut-in of the fuel supply from one operating cycle to the next. This also serves to prevent any fuel introduced being accidentally and spontaneously ignited due to the high temperatures of the residual combustion gases in the cylinder, even in the absence of applied ignition. In contrast to direct injection, it is not possible when using inlet manifold injection to ensure that the delivery of fuel to a cutoff cylinder will be completely stopped, as the principle of manifold injection involves wetting the walls in the intake tract with fuel.

Additionally, the direct injection of the fuel into the cylinders, like the partial cutoff itself, provides some dethrottling of the internal combustion engine, so that the two measures, the partial cutoff on the one hand and the direct injection on the other, enhance one another in the dethrottling.

With fuel injection disabled, the aspirated combustion air can still flow through the cutoff cylinder, the absence of any fuel charge ensuring that there is no combustible or ignitable fuel-air mixture available and that consequently—even if the ignition spark were introduced—no firing and no combustion occurs in this cylinder.

During the partial cutoff the cutoff cylinder basically makes no contribution to the power output of the internal combustion engine. If the fresh air feed is not cut off but is instead maintained, the air fed to the cutoff cylinder continues to play a part in the four working strokes—induction, compression, expansion and exhaust—so that not only does the cutoff cylinder not deliver any power, but work for the charge cycle has to be invested in this cylinder, which impairs the efficiency, that is to say it is thermodynamically disadvantageous.

For this reason, the air feed to a cutoff cylinder may be stopped at 224. Here the deactivated cylinder may be isolated from the combustion air supply by means of a shutoff valve. Where necessary the intake tract may be modified, each cylinder being equipped with a separate intake port, for example. Replacing the conventional intake system with a modified intake tract makes the concept suitable for retrofitting.

In some embodiments, in multi-cylinder internal combustion engines in which the cylinders are equipped with lift valves for charge cycle purposes, the lift valves of a cutoff cylinder may be deactivated. A cutoff cylinder then functions with valves closed during the partial cutoff. In this case the air present in the cylinder during compression is compressed by the piston moving upwards, the compressed air storing the work or energy introduced like a spring, before delivering it again, that is to say introducing it into the crankshaft drive, in the next stroke, the succeeding expansion stroke. Apart from a slight friction power deriving from the moving parts of the engine, no further losses occur, for which reason it is thermodynamically more advantageous to deactivate the valves of a cutoff cylinder than to allow a continuing flow of air through this cylinder during the charge cycle.

In some embodiments where airflow through the cut-off cylinder is disabled, the cylinders may be supplied with fuel by means of intake manifold injection, since in the cutoff state with valves closed and the intake manifold injection deactivated no fuel can get into the cylinder from the intake tract, in particular from the fuel-wetted walls.

At 226, the fuel amount delivered to the active cylinders and the throttle position may be adjusted so that torque and the desired air-fuel ratio within each cylinder are maintained. For example, when transitioning from an operating mode where all cylinders are fired to the partial cutoff mode, the throttle valve and fuel injection amounts may be adjusted to maintain operator-requested torque. In advantageous embodiments of the multi-cylinder internal combustion engine an adjustable throttle valve is provided for load control. One advantage of the adjustable throttle valve is that on activation or deactivation of the partial cutoff, that is to say of one cylinder, the engine torque does not fall or rise and the driver does not have to adjust the accelerator pedal in line with this in order to maintain the load, as would be the case with a non-adjustable throttle valve.

The adjustable throttle valve is preferably an electronically controlled throttle valve and an engine control assumes control of this throttle valve. This embodiment is also preferable in terms of the costs. Embodiments in which the throttle valve is adjustable by a closed-loop method are advantageous here.

Thus, method 200 includes operating an engine having an odd number n cylinders. When engine speed and load are above a threshold, all cylinders may be fired by activating fuel delivery, spark ignition, and intake and exhaust valve actuation for each cylinder every crankshaft cycle. When engine speed and load are below the threshold, a subset of the cylinders may be fired by deactivating fuel delivery, spark ignition, and intake and exhaust valve actuation for one cylinder every crankshaft cycle such that each cylinder is cut off once every n crankshaft cycles. In doing so, throttling losses may be prevented, thus increasing engine efficiency, and a balanced firing order may be maintained.

The method of FIG. 2 also includes operating an engine having an odd number of cylinders. Operating the engine includes, at greater output, spark igniting directly injected fuel in all cylinders, with each cylinder firing only once every two crankshaft rotations in a first firing order, and at lower output, spark igniting directly injected fuel in all cylinders, with each cylinder firing only once every four crankshaft rotations in a second, different firing order. The method also includes the first and second firing orders comprising cylinder firing at evenly spaced intervals, the second firing order including an interval between cylinder firings that is twice as long as an interval between cylinders firings of the first firing order.

Figure 3:
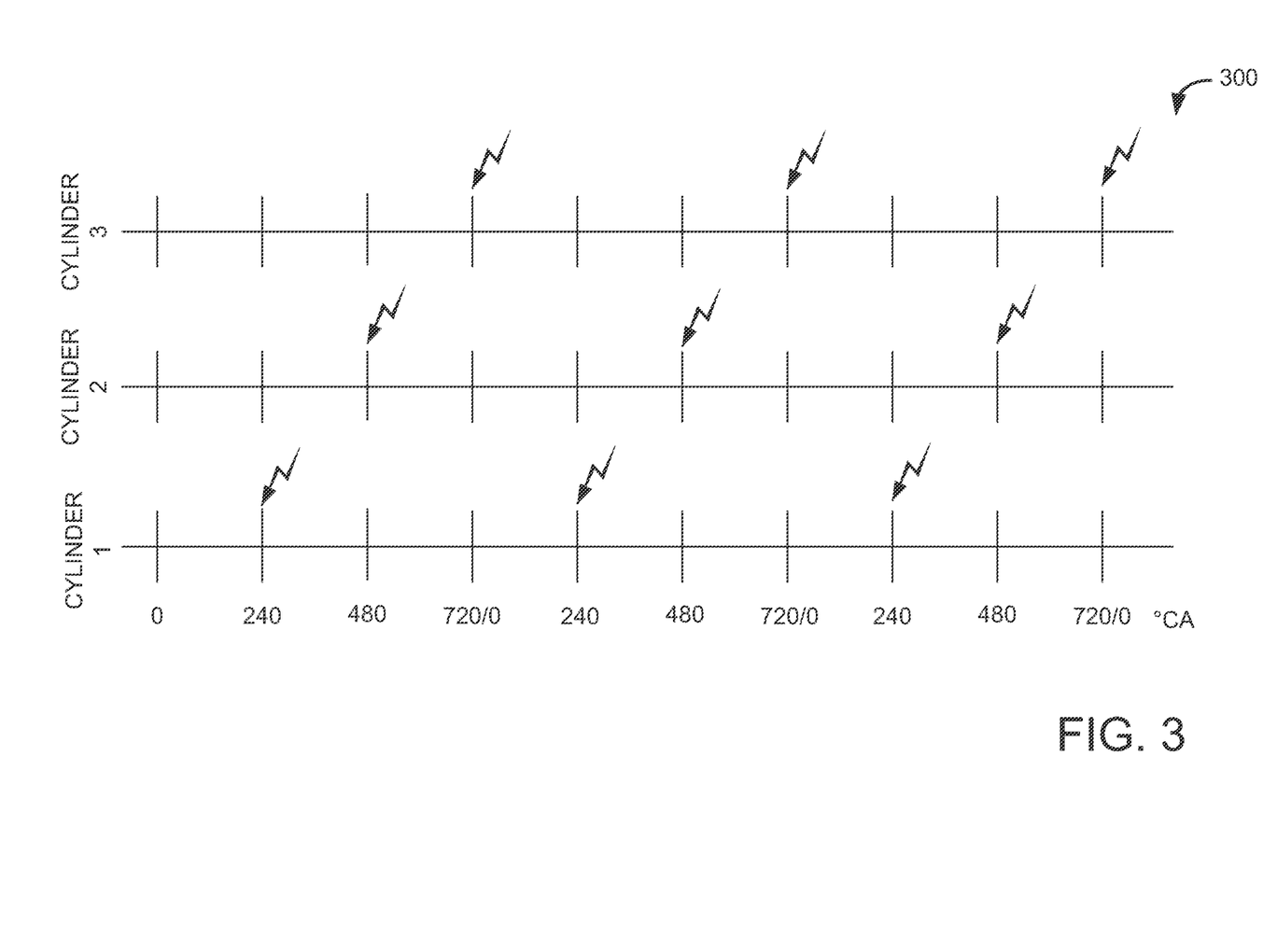
FIG. 3 shows an example diagram of the ignition points of the three cylinders of a three-cylinder in-line engine with applied ignition in normal, full cylinder operation.

FIG. 3 shows a diagram 300 of the ignition points of the three cylinders 1, 2, 3 of a three-cylinder internal combustion engine with applied ignition in standard operation whereby all cylinders are active. In standard operation, in which all three cylinders 1, 2, 3 are fired, the three cylinders 1, 2, 3 arranged in line are fired in succession in the firing order 1-2-3 and at an interval of 240° CA (illustrated by zigzag arrows). A regular firing pattern prevails at a firing interval of 240° CA.

The four working strokes of the internal combustion engine encompass two revolutions of the crankshaft and form one cycle. As can be seen from FIG. 3, the first outer cylinder 1 is fired at 0° CA, the second inner cylinder 2 at 240° CA and the third outer cylinder 3 at 480° CA. The last crank angle mark 720° CA represents the end of the first cycle and the start of the second following cycle, so that the crank angle here is counted from 0° CA again.

Figure 4:
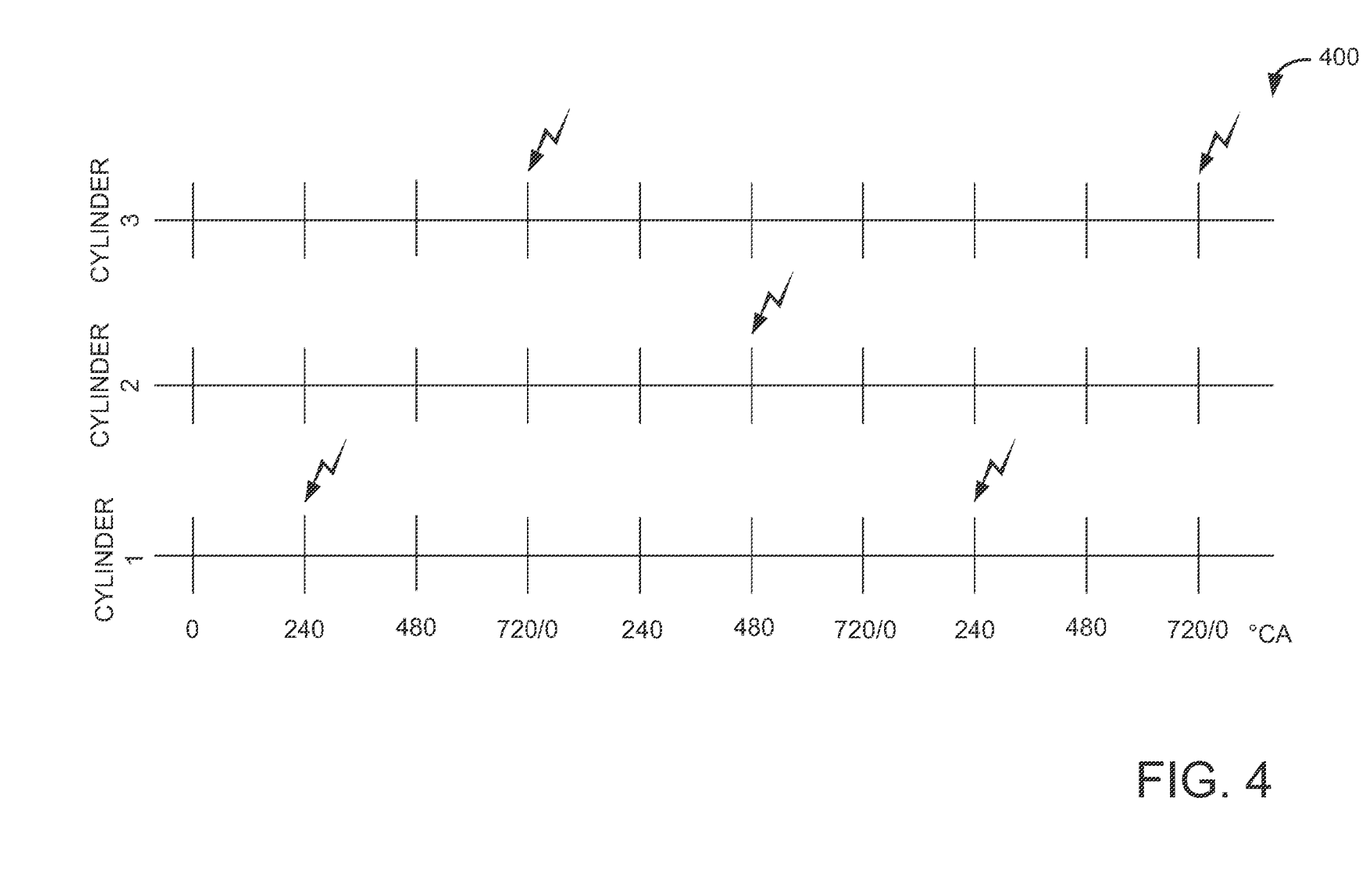
FIG. 4 shows an example diagram of the ignition points of the three cylinders of the three-cylinder in-line engine with applied ignition in partial cutoff.

FIG. 4 shows a diagram 400 of the ignition points of the three cylinders 1, 2, 3 of the three-cylinder internal combustion engine with applied ignition in partial cutoff. In partial load operation one cylinder 1, 2, 3 is cut off in the context of a partial cutoff and only two cylinders 1, 2, 3 are fired, the cylinders 1, 2, 3 being operated intermittently during the partial cutoff and each cylinder 1, 2, 3 being fired once and cut off once within two cycles.

Each cylinder 1, 2, 3 is fired and cut off in turn, so that in partial load operation the cylinders 1, 2, 3 are fired in the firing order 1-3-2 at an interval of 480° CA. During the partial cutoff, as also in normal operation, a regular firing pattern prevails, the firing interval being 480° CA.

As can be seen from FIG. 4, the first outer cylinder 1 is fired in the first cycle at 0° CA, the third outer cylinder 3 in the first cycle at 480° CA and the second inner cylinder 2 in the second cycle at 240° CA.

Figure 5:
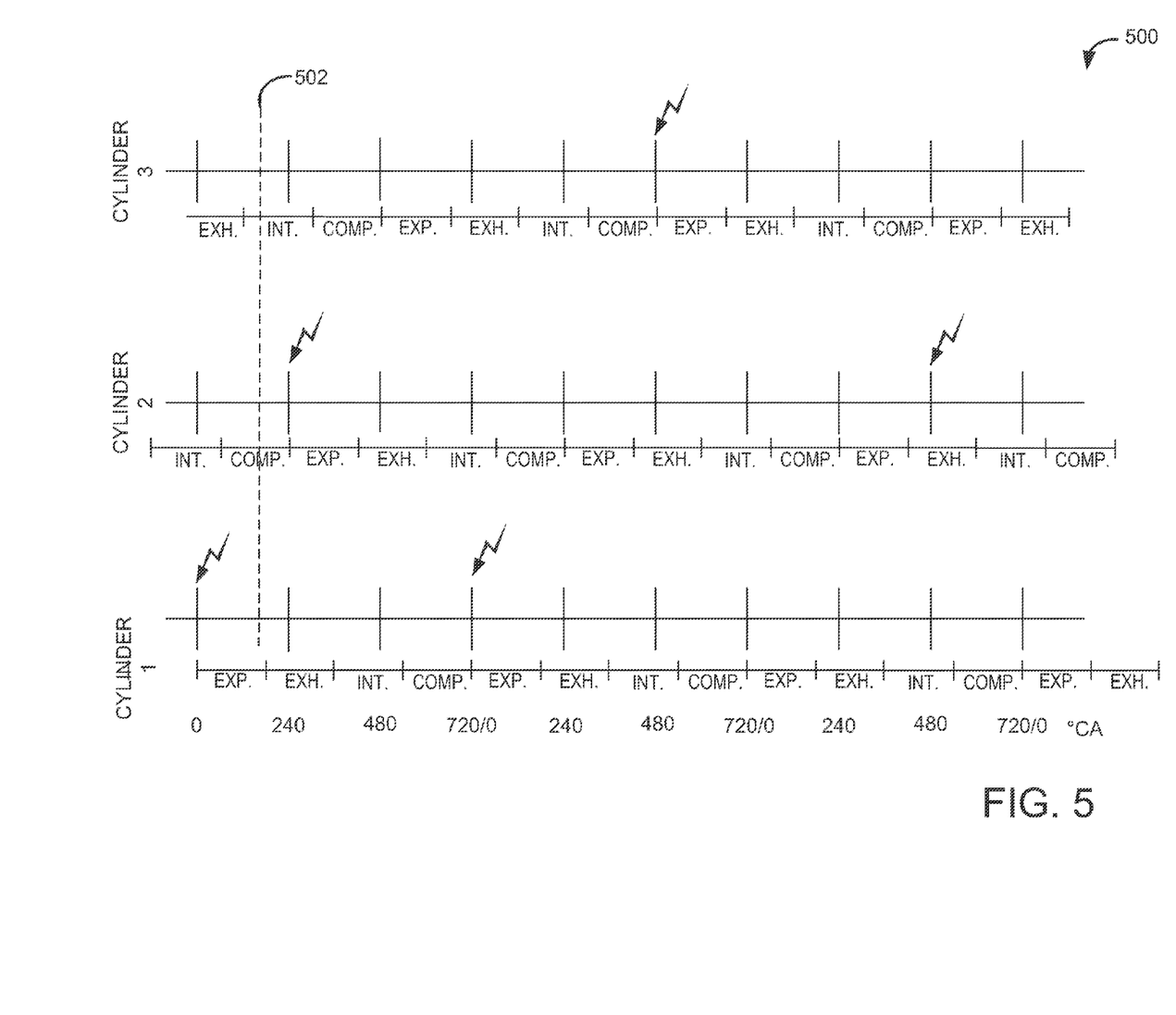
FIG. 5 shows an example diagram of the ignition points of the three cylinders of a three-cylinder in-line engine with applied ignition in a transition from the normal, full cylinder operation to the partial cutoff.

FIG. 5 is a diagram 500 illustrating a transition from standard, full cylinder firing operation to partial cutoff operation. Similar to FIGS. 3 and 4, three cylinders are depicted with a starting firing order of 1-2-3 at an interval of 240° CA. Additionally, the timing of each engine stroke, intake, compression, expansion, and exhaust, are depicted below each cylinder. At 0° CA, the first cylinder is at TDC of the compression stroke and thus fires. A transition to the partial cutoff operation occurs at 502, indicated by the dashed line, due to engine load dropping below a threshold, for example. However, because the transition occurs towards the end of the compression stroke for the second cylinder, fuel may already have been injected to the second cylinder, and deactivating the second cylinder may result in wasted fuel and degraded emissions. Thus, the second cylinder is fired at 240° CA and cylinder cutoff begins at the third cylinder, which is deactivated and therefore not fired at 720° CA. In this way, even though partial cutoff operation was indicated at 502 based on engine load, actual operation in the partial cutoff mode was delayed based on fuel economy and emissions. Transition to the partial cutoff mode may be delayed by any suitable parameter, such as catalyst temperature, engine speed, etc.

Figure 6:
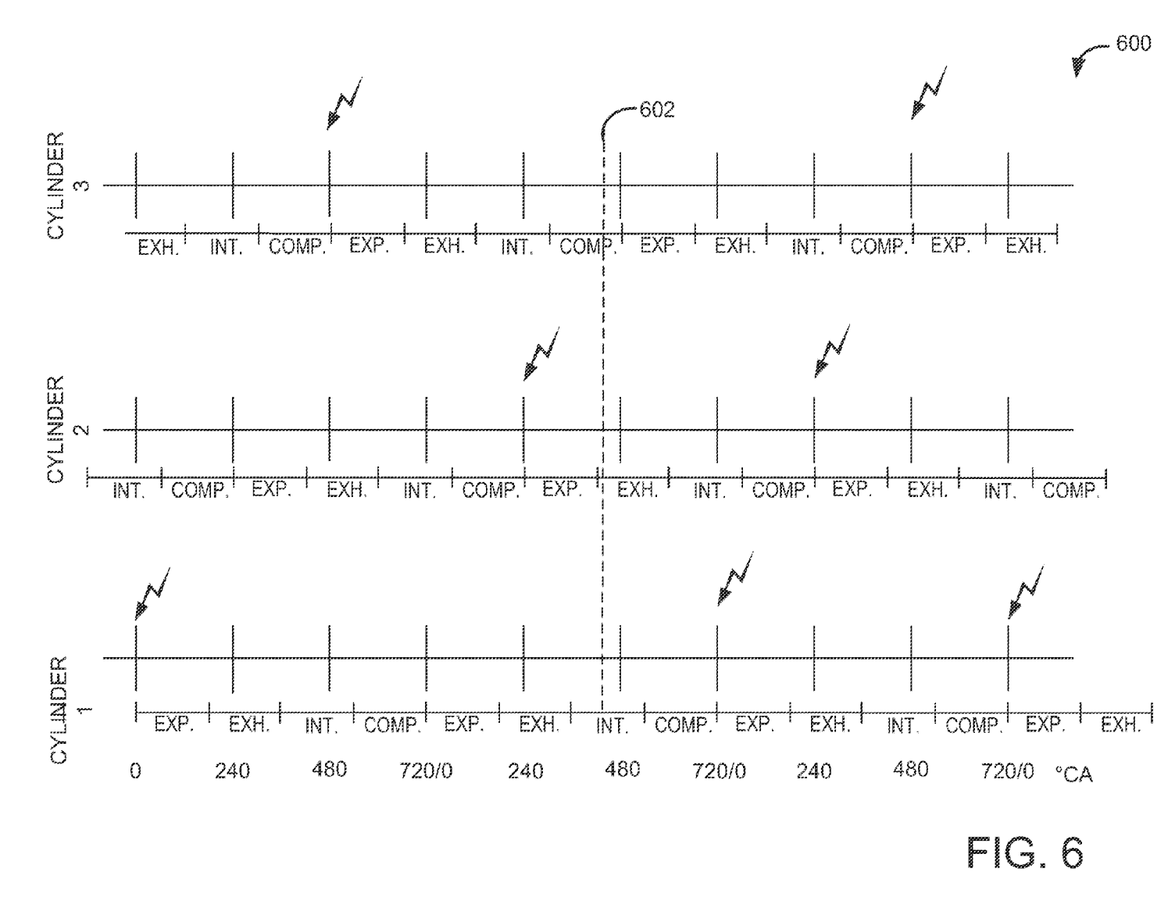
FIG. 6 shows an example diagram of the ignition points of the three cylinders of a three-cylinder in-line engine with applied ignition in a transition from the partial cutoff operation to the normal, full cylinder operation.

FIG. 6 is a diagram 600 illustrating a transition from operation in partial cutoff to standard, full cylinder operation. At 602, a transition to the standard full cylinder operation is indicated, based on engine load exceeding a threshold, for example. Cylinder two is fired previous to the transition, and thus cylinder three is the next cylinder in the standard firing order. However, because the transition is initiated late in the compression stroke of cylinder three, any fuel delivered may not have time to adequately mix prior to ignition, resulting in degraded emissions. As a result, cylinder three is skipped and full cylinder operation is resumed at cylinder one. In this way, even though standard operation was indicated at 602 based on engine load, actual operation in the standard mode was delayed based on emissions. Transition to the standard mode may be delayed by any suitable parameter, such as catalyst temperature, engine speed, etc.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-cylinder internal combustion engine, comprising:
    an odd number n of cylinders (n≥3), arranged in line;
    an applied ignition system;
    a fuel system for delivering fuel to the cylinders; and
    a controller having computer-readable instructions stored therein, the instructions executable to:
        during partial-load operation when engine load is below threshold, enable a partial cutoff of the cylinders, the partial cutoff comprising operating each cylinder intermittently such that each cylinder is fired and cut off in turn at an interval of (2*720° CA)/n, wherein each cylinder is cut off through deactivation of the applied ignition.

2. The multi-cylinder internal combustion engine as claimed in claim 1, wherein each cylinder is equipped with a spark plug for introduction of the applied ignition.

3. The multi-cylinder internal combustion engine as claimed in claim 1, wherein each cylinder is equipped with an injection nozzle to supply fuel by means of direct injection.

4. The multi-cylinder internal combustion engine as claimed in claim 1, wherein each cylinder is equipped with lift valves for charge cycle purposes.

5. The multi-cylinder internal combustion engine as claimed in claim 1, wherein an adjustable throttle valve is provided for load control.

6. A method, comprising
    operating a multi-cylinder internal combustion engine with applied ignition, in which an odd number n of cylinders is arranged in line; and
    during partial-load operation when engine load is below threshold, enabling a partial cutoff of the cylinders, the partial cutoff comprising operating each cylinder only intermittently such that each cylinder is fired and cut off in turn at an interval of (2*720° CA)/n.

7. The method as claimed in claim 6, wherein the engine is a spark ignited, three-cylinder, in-line engine, and further comprising:

during non-partial load operation when engine load is above the threshold, operating the engine in standard operation whereby the three cylinders are fired in sequence in an ignition order of 1-2-3 at an interval of 240° CA: and in partial-load operation when engine load is below the threshold, operating the engine in a partial cutoff mode, wherein during the partial cutoff each cylinder is operated intermittently such that each cylinder is fired and cut off in turn with a modified firing order of 1-3-2 at a firing interval of 480° CA.

8. The method as claimed in claim 6, wherein the engine is a spark ignited, five-cylinder, in-line engine, and further comprising:

during non-partial load operation when engine load is above the threshold, operating the five cylinders in standard operation whereby the cylinders are fired in sequence in an ignition order of 1-2-4-5-3 at an interval of 144° CA; and during partial-load operation when engine load is below the threshold, operating the engine in a partial cutoff mode, wherein during the partial cutoff each cylinder is operated intermittently such that each cylinder is fired and cut off in turn with a modified firing order of 1-4-3-2-5 at a firing interval of 288° CA.

9. The method as claimed in one claim 6, wherein a direct injection is provided for supplying fuel to the cylinders.

10. The method as claimed in claim 9, wherein a fuel supply to a cutoff cylinder is deactivated.

11. The method as claimed in claim 6, wherein the engine includes an intake system for feeding air, and wherein air feed to a cutoff cylinder is stopped.

12. The method as claimed in claim 6, wherein the cylinders are equipped with lift valves for charge cycle purposes, and wherein the lift valves of a cutoff cylinder are deactivated.

13. The method as claimed in claim 6, wherein each cylinder is equipped with a spark plug.

14. The method as claimed in claim 6, wherein the applied ignition of a cutoff cylinder is deactivated.

15. The method as claimed in claim 6, wherein the predefined load, below which a partial cutoff ensues, varies as a function of engine speed.

16. A method, comprising:

operating an engine having an odd number of cylinders;

at greater output, spark igniting directly injected fuel in all cylinders, with each cylinder firing only once every two crankshaft rotations in a first firing order; and at lower output, spark igniting directly injected fuel in all cylinders, with each cylinder firing only once every four crankshaft rotations in a second, different firing order.

17. The method of claim 16, wherein the first and second firing orders comprise cylinders being fired at evenly spaced intervals, the second firing order including an interval between cylinder firings that is twice as long as an interval between cylinders firings of the first firing order.

18. The method of claim 16, wherein the engine comprises five cylinders and further comprising:

at greater output, firing a cylinder every 144° CA; and at lower output, firing a cylinder every 288° CA.

19. The method of claim 16, wherein the engine comprises three cylinders and further comprising:

at greater output, firing a cylinder every 240° CA; and at lower output, firing a cylinder every 480° CA.

20. The method of claim 16, further comprising, when transitioning from firing all cylinders to firing a subset of the cylinders, adjusting an adjustable throttle valve and a fuel amount delivered to each active cylinder in order to maintain torque.

* * * * *